United States Patent

White

[11] 4,041,706
[45] Aug. 16, 1977

[54] LINEAR FORCE GENERATOR AND HEAT ENGINE EMBODYING SAME

[76] Inventor: Fred I. White, 489 W. 7th St., Claremont, Calif. 91711

[21] Appl. No.: 558,822

[22] Filed: Mar. 17, 1975

[51] Int. Cl.² ............................................. F03G 7/06
[52] U.S. Cl. .................................................. 60/527
[58] Field of Search ................................. 60/527–529

[56] References Cited

U.S. PATENT DOCUMENTS

| 3,625,002 | 12/1971 | Davis | 60/528 |
| 3,699,769 | 10/1972 | Bondurant | 60/527 |
| 3,937,019 | 2/1976 | Renner | 60/527 |

*Primary Examiner*—Allen M. Ostrager
*Attorney, Agent, or Firm*—Boniard I. Brown

[57] ABSTRACT

A heat powered linear force generator and a heat engine embodying a plurality of the force generators for driving a rotary output shaft. The linear output force of the force generator is a periodic linear force acting continuously in the same direction and produced by exposure of linearly expandable and contractible means, such as one or more wires, having a relatively high coefficient of thermal expansion and contraction alternately to hot and cold working fluids. The several force generators of the heat engine are operatively coupled to the engine output shaft in such a way that the generators operate in timed relation to produce a relatively continuous driving torque on the shaft.

5 Claims, 7 Drawing Figures

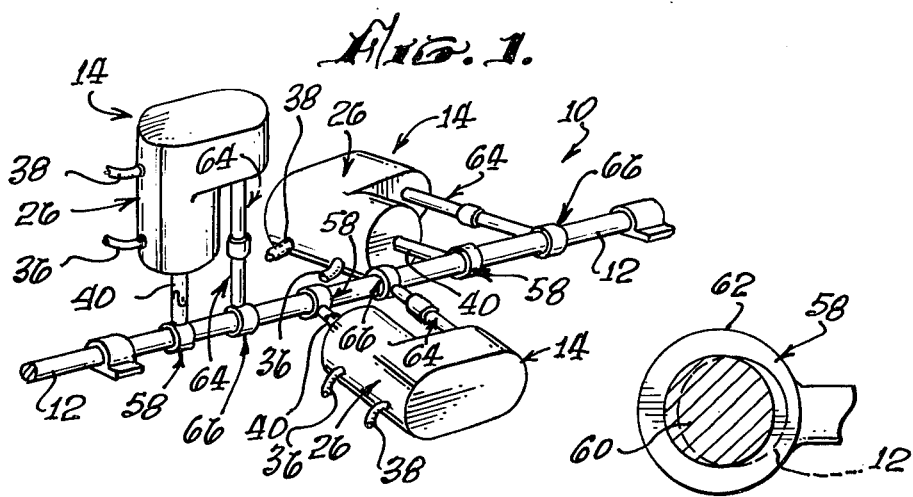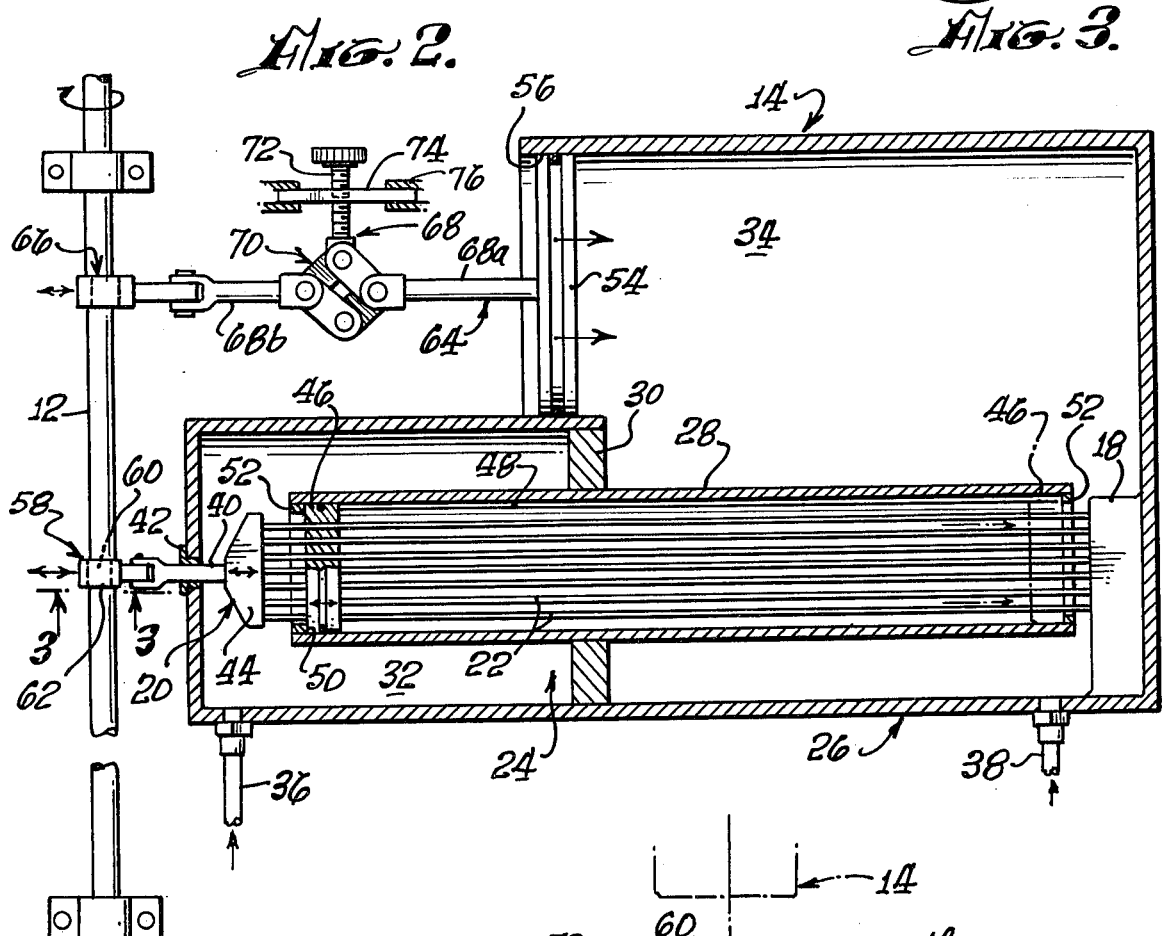

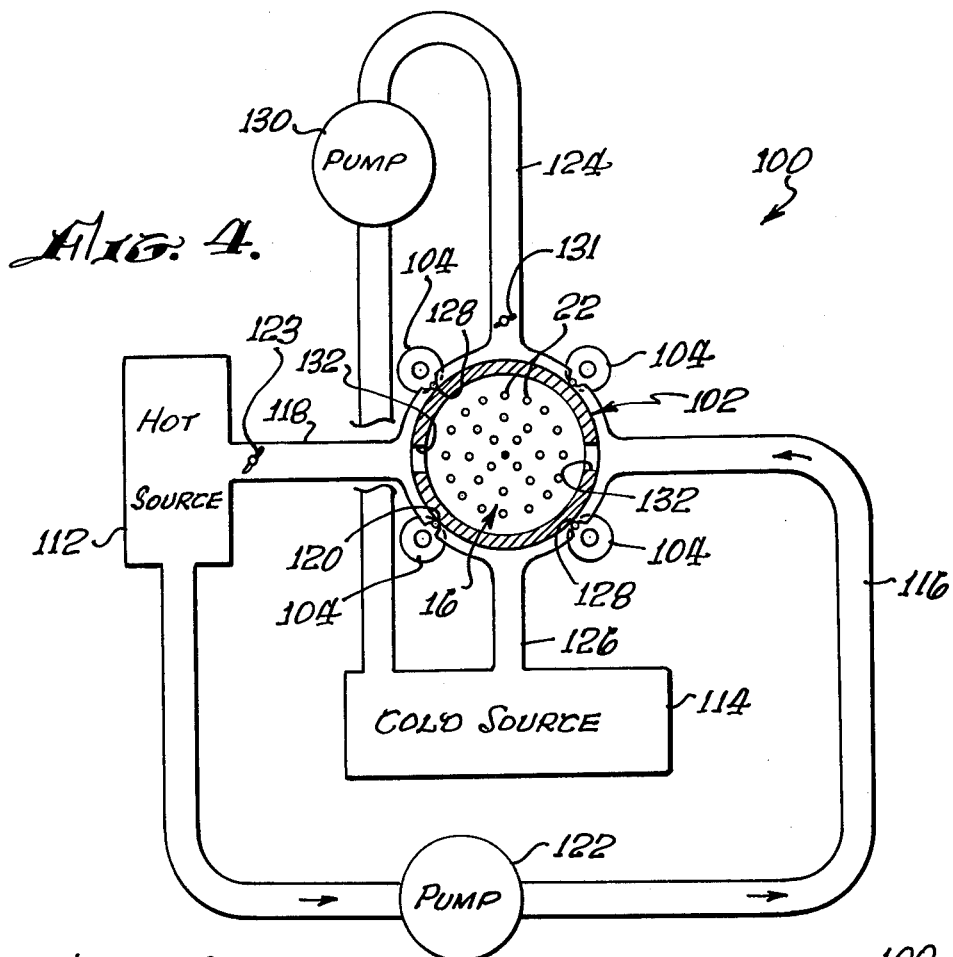
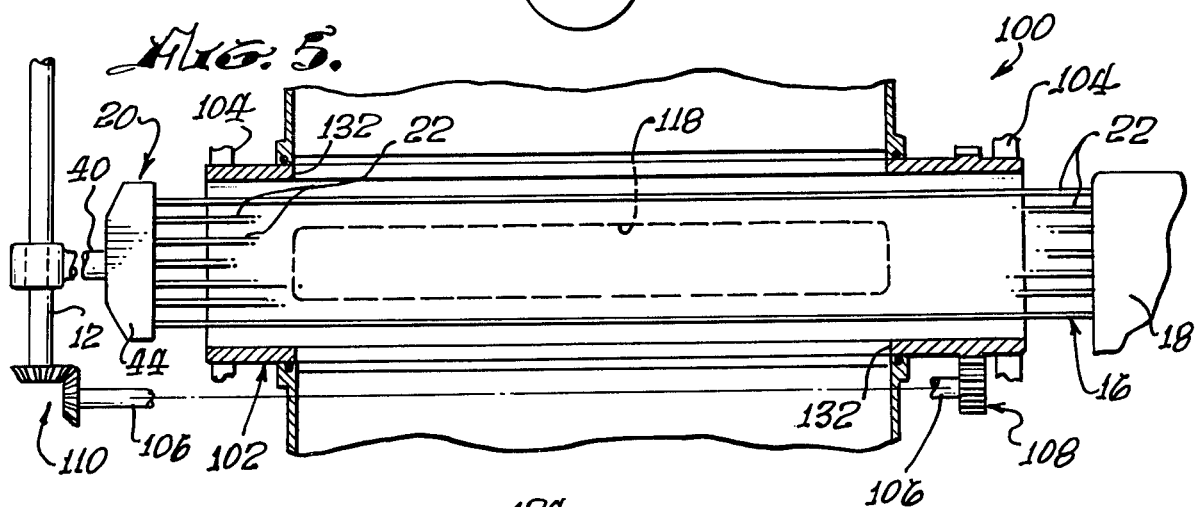
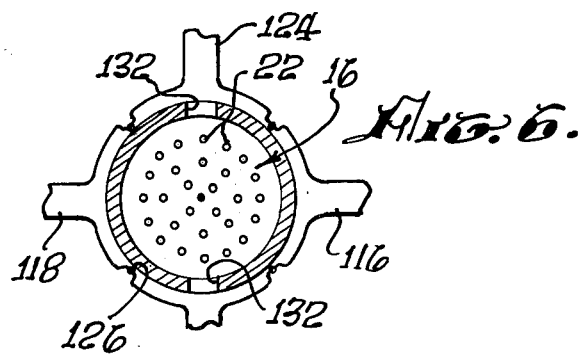

LINEAR FORCE GENERATOR AND HEAT ENGINE EMBODYING SAME

BACKGROUND OF THE INVENTION

1. Field of the Invention

This invention relates generally to the art of converting heat energy to mechanical energy and more particularly to a novel method of converting heat energy to linear and rotary output forces and motions and to a novel heat powered linear force generator and rotary heat engine.

2. Discussion of the Prior Art

The prior art is replete with a vast assortment of methods and devices for converting heat energy to mechanical energy. Examples of such devices are steam engines, internal combustion engines, and the like. Engines of this type, of course, convert heat energy to mechanical energy by utilizing the heat energy to produce a pressurized working fluid which then acts on a movable pressure wall, such as a piston, to drive the latter in a linear motion or other motion which is converted to a desired output motion of the engine output member. Thus, such engines do not utilize the input heat energy directly but rather indirectly to pressurize a gas which then acts on a mechanical element to produce the mechanical output energy.

It has been proposed in the past to convert heat energy to mechanical energy in a different manner by effecting thermal deformation of a mechanical element and converting this thermal deformation to a mechanical motion. Heat powered devices of this kind are described in U.S. Pat. Nos. 1,826,273; 2,337,084; 3,142,149; 3,229,177; 3,303,642; 3,430,441; and 3,625,002.

SUMMARY OF THE INVENTION

This invention utilizes heat energy directly to effect thermal expansion and contraction of a mechanical means whose thermal deformation provides an output force for producing a mechanical motion. According to the invention, this is accomplished by connecting one end of a linear, thermally expandable and contractible force producing means having a relatively high coefficient of thermal expansion and contraction to a fixed support and the other end of the means to a linearly movable output member and exposing the force producing means alternately to hot and cold working fluids. The resulting thermal deformation of the force producing means produces an intermittent linear force on the output member. In the particular inventive embodiments described, the force producing means whose thermal contraction exerts a linear force on the output member are wire-like elements.

Two different methods are disclosed for exposing the force producing means to the hot and cold work fluids alternately. According to one exposure method, the force producing means are enclosed in a cylinder containing a thermal barrier in the form of a floating piston which is thermally sealed to the cylinder and the means to define hot and cold fluid chambers at opposite sides of the barrier. This barrier is driven back and forth through the cylinder, as by unbalancing the pressures of the hot and cold working fluids in the chambers to expose the force producing means to the hot and cold fluids alternately. According to another exposure method, the force producing means are enclosed in a housing into which the hot and cold fluids are admitted alternately, as by rotating the housing to intermittently align ports in the housing with ports in hot and cold fluid supply conduits. These described structures are termed heat powered linear force generators.

Another aspect of the invention is concerned with a heat engine. This heat engine embodies a plurality of the heat powered force generators arranged about and operatively coupled to a rotary output shaft and operated in timed relation to produce a generally continuous driving torque on the shaft.

BRIEF DESCRIPTION OF THE DRAWINGS

FIG. 1 is a perspective view of a heat engine according to the invention;

FIG. 2 is an enlarged section through one of the linear force generators embodied in the engine;

FIG. 3 is an enlarged section taken on line 3—3 in FIG. 2;

FIG. 3A illustrates the relative angular positions of certain eccentrics embodied in each force generator of the heat engine;

FIG. 4 illustrates a modified heat powered linear force generator according to the invention;

FIG. 5 is an enlarged section taken on line 5—5 in FIG. 4; and

FIG. 6 is a fragmentary section similar to FIG. 4 in another operating phase.

DESCRIPTION OF THE PREFERRED EMBODIMENT

The heat engine 10 shown in FIG. 1 has a rotary output shaft 12 and three heat powered linear force generators 14 spaced about and along the shaft. These force generators are operatively connected to the shaft and operated in timed relation in a manner such that the generators act in concert to produce a relatively uniform and constant driving torque on the shaft. One of the force generators is shown in enlarged detail in FIG. 2.

Turning to FIG. 2, the illustrated heat powered linear force generator 14 comprises force producing means 16 extending between a fixed support 18 and a linearly movable output member 20 movable toward and away from the fixed support along a linear path. Force producing means 16 extending between a fixed support 18 and a linearly movable output member 20 movable toward and away from the fixed support along a linear path. Force producing means 16 comprises at least one, and in this instance several, expandable and contractible linear force producing elements 22, such as wires constructed of nichrome, steel alloy or other suitable metal or other solid material, such as nylon plastic, having a relatively high thermal coefficient, i.e., coefficient of thermal expansion and contraction. Wires 22 are fixed at their ends to the fixed support 18 and output member 20 and extend parallel to the path of movement of the member. Means 24 are provided for exposing the wires 22 alternately to hot and cold working fluids to effect alternate expansion and contraction of the wires. As will be explained presently, the output member 20 is moved outwardly away from the fixed support 18 during each exposure of the wires to the hot fluid so that contraction of the wires during each following exposure of the wires to the cold fluid produces a force on the output member for driving the member inwardly toward the fixed support. Thus, alternate exposure of the wires to the hot and cold fluids produces an intermittent linear force on the output member.

Referring to the force generator 14 in more detail, the force producing wires 22 are enclosed in a housing 26 including a cylinder 28 which surrounds and extends lengthwise of the wires. This cylinder is supported between its ends by an inner wall 30 of the housing 26 which divides the latter into two interior spaces 32 and 34. Connected to these spaces are conduits 36 and 38 for supplying cold and hot working fluids, such as cold and hot air, to the spaces. Fixed support 18 is located in housing space 34 and is secured to a wall of the housing. Movable output member 20 is located in housing space 32 and has a rod 40 which slides in a bearing 42 in a wall of the housing and a crosshead 44 on the inner end of the rod. Wires 22 are secured to the crosshead.

Within and movable endwise through the cylinder 28 is a thermal barrier 46 in the form of a floating piston. The outer circumstances of this piston slides in and is sealed to the wall of the cylinder. The piston contains bores which slidably receive the wires 22, whereby the piston is sealed to both the cylinder and wires against fluid leakage from one side of the piston to the other. The piston divides the interior of the cylinder into hot and cold fluid chambers 48 and 50 opening through the cylinder ends to the hot and cold housing spaces 34, 32, respectively. Endwise movement of the piston in the cylinder is limited by shoulders 52 at the cylinder ends. From this description, it will be understood that left hand movement of the piston 46 to its full line position of FIG. 2 exposes the wires 22 to hot working fluid. Right hand movement of the piston to its broken line position exposes the wires to cold working fluid.

Piston 46 is moved back and forth between its full and broken line positions by working fluid pressure. To this end, the hot and cold working fluids are supplied to the housing spaces 32, 34 at equal pressures and thus tend to produce a pressure balance on the piston. A pressure unbalance for moving the piston is created by a second piston 54 movable in a second cylinder 56 in the housing 26 and communicating with the housing space 34. Reciprocation of piston 54, which is relatively large compared to piston 46, effects alternate expansion and contraction of the housing space 34 and thereby pressure fluctuations in the latter space and the hot cylinder chamber 48 which drive the piston 46 back and forth in its cylinder 28, to effect alternate expansion and contraction of the wires 22. The manner in which the piston 54 is reciprocated will be explained presently.

As noted earlier, the heat engine 10 embodies three of the heat powered linear force generators 14. The output member 20 of each generator is coupled to the engine output shaft 12 by an eccentric coupling 58 including an eccentric 60 on the shaft and a bearing 62 which is rotatable on the eccentric and hinged to the output member rod 40 such that contraction of the force generator wires 22 when the maximum throw of the eccentric is at an oblique angle to the wires produces a driving torque on the shaft 12.

Piston 54 of each force generator has a rod 64 which is coupled by a similar eccentric coupling 66 to the shaft 12. Coupling 66 drives the piston 54 in reciprocation within its cylinder 56 when the shaft 12 rotates. The eccentrics of the two eccentric couplings 58, 66 for each force generator are relatively angularly oriented with their maximum throws displaced approximately 15 degrees, as shown in FIG. 3A, such that assuming shaft 12 is rotating and piston 46 is initially in its full line position of FIG. 2, piston 54 is retracted outwardly immediately following thermal expansion of the wires 22 by the hot working fluid in cylinder chamber 48 to reduce the pressure in the latter chamber and cause right hand movement of piston 46 to its broken line position. This exposes the wires to the cold working fluid in cylinder chamber 50 to cause contraction of the wires, thereby pulling the output member 20 to the right or inwardly to drive the shaft 12 through a small angle. Immediately following this contraction, continued rotation of the shaft drives the piston 54 to the right to increase the pressure in cylinder chamber 48 and drive the piston 46 back to its full line position for effecting re-expansion of the wires and drives the output member 20 outwardly or to the left to take up the slack in the expanding wires.

Piston rod 64 contains a throttle mechanism 68 including toggle linkage 70 connected between two coaxial sections 68a, 68b of the rod. Rotatably connected to the linkage is a screw 72 threaded in a slide 74 which is mounted in a support 76 for back and forth movement with the piston 54. It will be understood that adjustment of the screw 72 adjusts the piston 54 along its path of reciprocation independently of rotation of the shaft 12, thus to govern the piston stroke.

It will be umderstood that throttling can be also effected by metering fuel flow or metering heat input.

Returning to FIG. 1, the three linear force generators 14 of the heat engine 10 are spaced 120° apart about the shaft 12 and the eccentrics of their eccentric couplings 58, 66 are similarly spaced, such that the generators undergo their expansion and contraction phases in sequence. During the contraction phase of each generator, its contracting wires 22 exert an inward force or pull on the output member 20 of the generator. This force acts on the shaft 12 through the respective eccentric coupling 58 to drive the shaft through an angle of approximately 120°, such that the three generators acting in concert produce a relatively uniform driving torque on the shaft. Rotation of the shaft, in turn, drives the generator pistons 54 in their reciprocating motion to cause the generators to proceed through their alternate expansion and contraction phases.

FIGS. 4-6 illustrate a modified heat powered linear force generator 100 which may be used in the heat engine of FIG. 1 in place of the force generators 14 shown in the latter figure. Generator 100 is similar to generator 14 except that the piston 54 and cylinder 56 of generator 14 are omitted and the fixed cylinder 28 and floating piston or heat barrier 46 of the latter generator are replaced, in generator 100, by a rotary cylindrical housing 102. Housing 102 encloses the wires 22 of the generator and is rotatably supported in bearings 104 to rotate about the central axis of the housing. The housing is driven in rotation from the engine output shaft 12 through a coupling shaft 106 and meshing gear sets 108, 110, on the coupling shaft, housing, and output shaft, the housing rotating at one-half the speed of the output shaft. Housing 102, fixed support 16, the inner end of generator output member 20 are enclosed in a sealed housing (not shown) in a manner similar to the corresponding parts of the generator 14.

The force generator 100 embodies hot and cold working fluid sources 112, 114. The hot source 112 is connected to delivery and discharge conduits 116, 118, respectively, having open ends which seat slidably against and are sealed by seals 120 to diametrically opposite sides of the housing 102. Arranged in the delivery conduit 116 is a pump 122, and a throttle valve 123 is provided in conduit 118. Similarly, the cold fluid source 114 is connected to delivery and discharge conduits 124, 126 having open ends which seat slidably against and are sealed by seal rings 128 to diametrically opposite sides of the housing 102 in the plane of but spaced 90° from the conduits 116, 118. A pump 130 and a throttle valve 131 are arranged in the delivery conduit 124.

The open ends of the conduits 116, 124 form delivery ports while the open ends of the conduits 118, 126 form exhaust ports. In the wall of the housing 102 in the plane of the delivery and exhaust ports are a pair of diameterically opposed ports 132 which register alternately with the delivery and discharge ports of the conduits 116, 118, 124, 126 during rotation of the housing.

During operation of the force generator 100, assuming the housing 102 is rotating, the pumps 122, 130 are operated to circulate hot and cold fluids, such as air, from the sources 112, 144, from the discharge ports to the delivery ports of the conduits 116, 118, 124, 126. When the housing ports 132 register with the delivery and discharge ports of the hot fluid conduits 116, 118, 20 hot working fluid from source 112 flows through the housing 102 to effect thermal expansion of the generator wires 22. When the housing ports register with the delivery and discharge ports of the cold fluid conduits 124, 126, cold working fluid from the source 114 flows through the housing 102 to effect thermal contraction of the wires. Thus, the wires undergo alternate thermal expansion and contraction as did the wires in the force generator 14.

It will now be understood that a heat engine similar to that of FIG. 1 may utilize three of the linear force generators 100. In this modified heat engine, the three force generators are arranged about and coupled to the engine output shaft 12 in the same manner as the force generators 14 in FIG. 1 and thus operate in concert to drive the shaft in rotation in the same manner as described earlier in connection with FIG. 1.

The heat engines of the invention may be used as prime movers for a variety of applications. Moreover, a variety of heat sources may be used to generate the heat required for engine operation. Possible heat sources are combustible fuels, solar energy and geothermal energy. The cooling required for engine operation may be provided in various ways. For example, depending on the temperature difference desired between the hot and cold working fluids, the cold fluid may be ambient air or refrigerated air or other fluid.

With the unit enclosed in a housing, the ends of cylindrical housing 102 need not be sealed; otherwise, these housing ends would be sealed.

The inventor claims:

1. A heat powered linear force generator comprising:
    a relatively fixed support,
    a relatively movable output member,
    means supporting said output member for reciprocating motion along a linear path toward and away from said support,
    force producing means including at least one elongate linearly expandable and contractible force producing element having a relatively high coefficient of thermal expansion and contraction extending between and secured at its ends to said support and output member, respectively, and
    means for exposing said force generating element alternately to relatively hot and relatively cold working fluids to effect alternate thermal expansion and contraction of said element, said exposing means comprising an elongate housing in closing said force producing means, hot and cold fluid supply conduits, ports in said housing, and means for moving said housing to communicate said housing ports with said hot and cold conduits alternately.

2. A force generator according to claim 1 wherein:
    said housing comprises a cylindrical housing,
    said hot conduit has fluid inlet and exhaust ports at diametrically opposite sides of said housing,
    said cold conduit has fluid inlet and exhaust ports at diametrically opposite sides of said housing between and in the plane of said hot conduit ports,
    said housing has a pair of diametrically opposed ports in said plane, and
    said means for moving said housing comprises means for rotating said housing.

3. A force generator according to claim 2 wherein: said force producing means comprises a plurality of wires.

4. A heat engine comprising:
    a rotary output shaft,
    a plurality of linear force generators spaced about said shaft,
    each force generator comprising a relatively fixed support, a relatively movable output member, means supporting said output member for reciprocating motion along a linear path toward and away from said support, force producing means including at least one elongate linearly expandable and contractible force producing element having an relatively high coefficient of thermal expansion and contraction extending between and secured at its ends to said support and output member, respectively, means for exposing said force generating element alternately to relatively hot and relatively cold working fluids to effect alternate thermal expansion and contraction of said element,
    means coupling said output member of each force generator to said shaft for converting the linear force exerted on each output member by thermal contraction of its force producing means to a driving torque on said shaft, and
    means for operating said exposing means of the several force generators in timed relation, said exposing means of each force generator comprising an elongate housing enclosing said force producing means, hot and cold fluid supply conduits, ports in said housing, and means for moving said housing to communicate said housing ports with said hot and cold conduits alternately.

5. A heat engine according to claim 4 wherein:
    said housing of each force generator comprises a cylindrical housing,
    said hot conduit has fluid inlet and exhaust ports at diametrically opposite sides of said housing,
    said cold conduit has fluid inlet and exhaust ports at diametrically opposite sides of said housing between and in the plane of said hot conduit ports,
    said housing has a pair of diametrically opposed ports in said plane, and
    said means for operating said exposing means in timed relation comprises means for rotating the several housings of said force generators in timed relation.

* * * * *